March 24, 1970 T. F. BRYZINSKI ET AL 3,501,830

METHODS OF MAKING A FILAMENTARY MAGNETIC MEMORY USING FLEXIBLE SHEET MATERIAL

Filed Jan. 22, 1968 2 Sheets-Sheet 1

INVENTORS
THADDEUS F. BRYZINSKI
LARRY L. LAUNT

BY Hoffman Stone

ATTORNEY

INVENTORS
THADDEUS F. BRYZINSKI
LARRY L. LAUNT

BY Hoffman Stone
ATTORNEY

United States Patent Office 3,501,830

Patented Mar. 24, 1970

3,501,830
METHODS OF MAKING A FILAMENTARY MAGNETIC MEMORY USING FLEXIBLE SHEET MATERIAL

Thaddeus F. Bryzinski, West Webster, and Larry L. Launt, Holcomb, N.Y., assignors to Stromberg-Carlson Corporation, Rochester, N.Y., a corporation of Delaware Filed Jan. 22, 1968, Ser. No. 699,672
Int. Cl. H01f 7/06
U.S. Cl. 29—604 3 Claims

ABSTRACT OF THE DISCLOSURE

A flexible insulating sheet material with conductive strips bonded to its surface is laid upon a support, and an array of spaced insulating lands defining grooves between them is cast in situ upon the sheet with the lands and grooves aligned normally to the conductive strips. Stretchable filaments, typically of nylon, are placed in the grooves, and outer portions of the sheet material are folded over the array of lands and grooves and bonded in place. The stretchable filaments are withdrawn, leaving elongated apertures to receive filamentary magnetic memory elements. The laminate is rigidified by cementing it between rigid plates, and edge portions of the flexible sheet are folded back to expose end portions of the conductive strips for connecting them to an external circuit.

BRIEF SUMMARY OF THE INVENTION

This invention relates to novel magnetic memories, and, more particularly, to novel arrays of thin film magnetic memory elements and methods of making them.

This application is a companion of the following concurrently filed co-pending applications:

Ser. No. 699,673, entitled "Filamentary Magnetic Memory and Methods of Making It Using Rigid Printed Circuit Cards."

Ser. No. 699,674, entitled "Filamentary Magnetic Memory Including Word Straps Constituting More Than One Turn Around Each Magnetic Filament."

There has been much recent interest in thin film magnetic memory devices of the type including filaments such as wires coated with thin films of magnetic material, typically applied by electrolysis, or by evaporation in vacuo. See, for example, an article entitled, "Plated Wire Magnetic Film Memories" by U. F. Gianola, at page 408 of the Bell Laboratories Record, vol. 42 (December 1964). The filaments are typically about .004 to .005 inch in diameter, and the thin film magnetic material is typically about one micron thick. The output signals produced in the operation of devices of this type are relatively small, typically on the order of a few millivolts, and it is important to achieve a high degree of uniformity in the spacings between successive wires when they are arranged in parallel array to form a matrix, otherwise variations in coupling between the wires and crossing conductors at different points along the lengths of the wires may tend to introduce errors into the system. And in the interest of space conservation, it is desirable to space the wires as closely together as possible.

Briefly, in accordance with the invention, an array of filaments, each coated with a thin film of magnetic material, is arranged in a sandwich construction between two sheets of insulating material, on the mutually facing sides of which electrical conductors are arranged in opposed registration to each other and orthogonally to the filaments. Small strips of insulating material cast in situ are fixed to the insulating sheets between successive ones of the filaments. The sheets of insulating material may be either flexible or rigid, and if flexible, the assembly is rigidized by the provision of suitable supporting plates. Arrangements are made to make electrical connections to the conductive strips carried on the insulating sheets and to the filaments.

In accordance with the methods of the invention, the laminated construction is built up in step-wire fashion, and the opposing insulating sheets are bonded together with stretchable filaments in place of the magnetically coated filaments. The stretchable filaments are selected to be of a material relatively resistant to the adhesive action of the bonding agent, and are of slightly larger diameter than the magnetically coated filaments. After the insulating sheets have been bonded, and the bonding agent cured, the stretchable filaments are withdrawn, which can be readily done because of the "necking down" action caused by stretching. The magnetically coated filaments are then inserted into the tunnel-like apertures left after removal of the stretchable filaments.

When the insulating sheets are initially flexible, terminal portions of the sheets may be folded back upon the main body of the laminate to facilitate making electrical connections to the conductors carried by them. When the insulating sheets are rigid, holes are first drilled through them, penetrating also the respective conductors carried by them. Connections are then made to the conductors through the holes to conductive elements on the opposite sides of the sheets by any desired method such as, for example, by electroplating.

DETAILED DESCRIPTION

The invention will now be described in greater detail in conjunction with the accompanying drawings, wherein.

Figure 1:
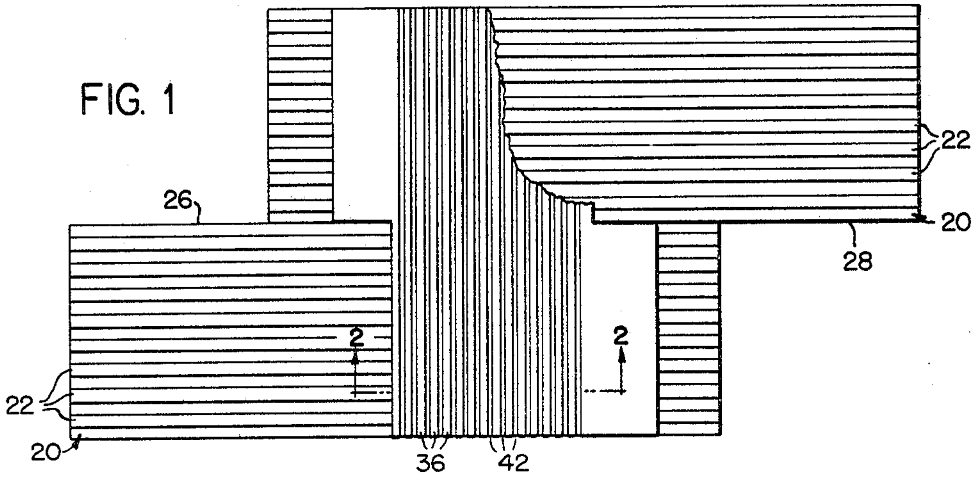
FIGURE 1 is a plan view illustrating one step in the manufacture of a magnetic memory device according to the invention.
Figure 2:
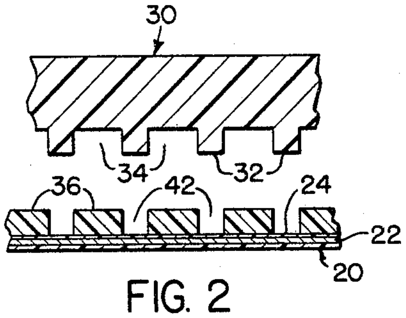
FIGURE 2 is a cross-sectional view taken along the line 2—2 of FIGURE 1, and showing removal of the mold used to cast the insulating lands in situ.
Figure 4:
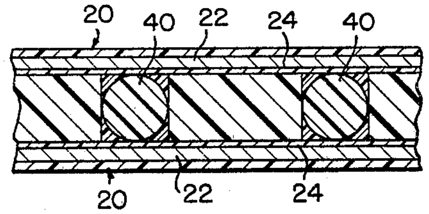
FIGURE 4 is a cross-sectional view, on an enlarged scale, of the laminate shown in FIGURE 3.
Figure 3:
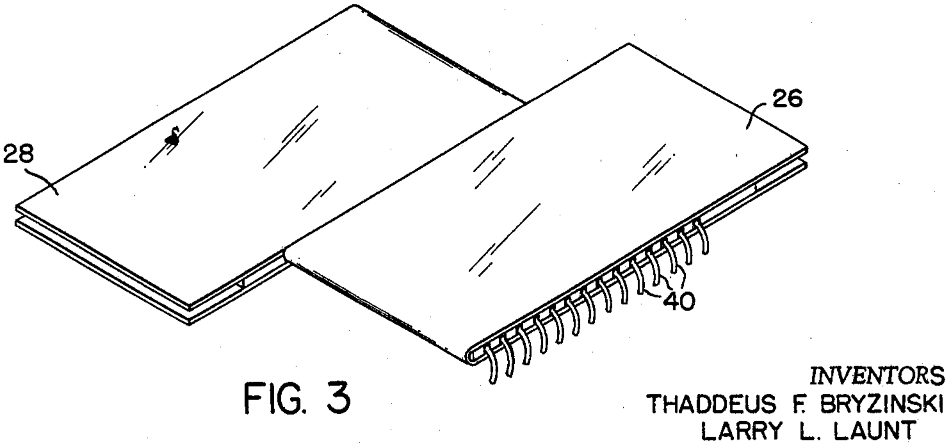
FIGURE 3 is an isometric view illustrating another step in the manufacture of the memory device.
Figure 5:
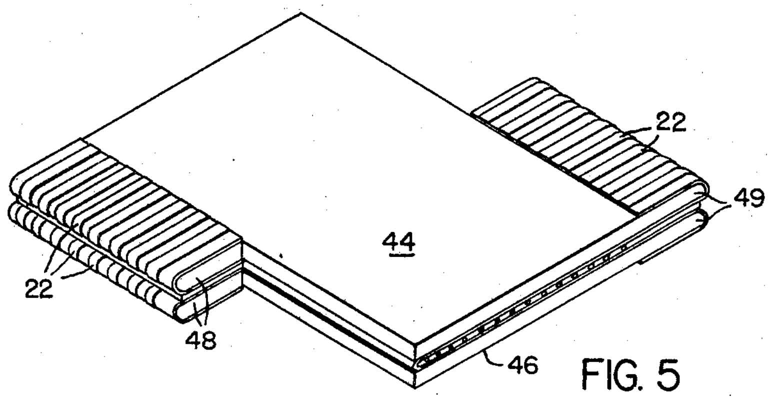
FIGURE 5 is an isometric view generally similar to the view of FIGURE 3, but showing further steps in the manufacture of the device.
Figure 6:
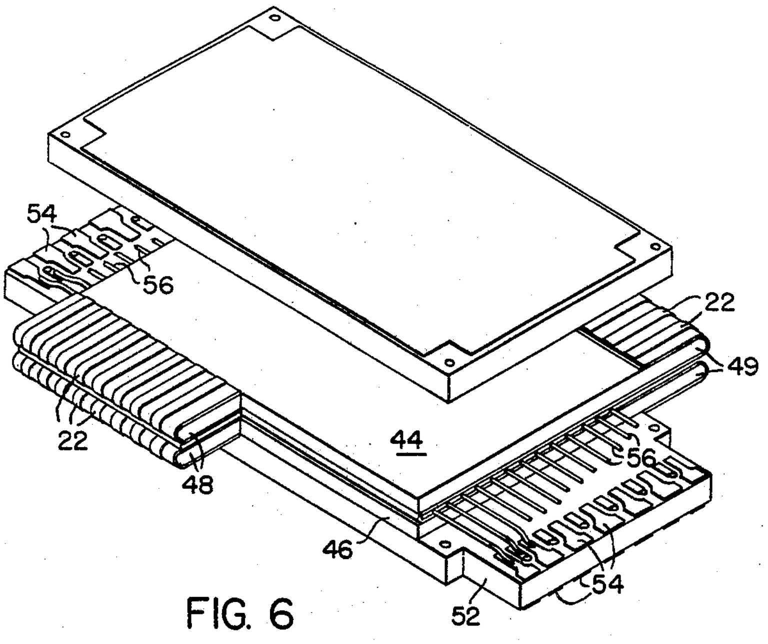
FIGURE 6 is an exploded isometric view generally similar to the views of FIGURES 3 and 5, but showing the final manufacturing steps.

A magnetic memory device according to a first embodiment of the invention, and the presently preferred method of making it are illustrated in FIGURES 1 to 6.

As shown, the initial starting material is a sheet 20 of flexible insulating material such as a synthetic resin commercially available under the tradename Mylar, having strips 22 of a conductive material such as copper foil bonded to one surface in close spaced parallel array. Typically, the sheet 20 is about .001 inch thick, and the strips 22 are about .025 inch in width, spaced on about .05 inch centers, and about .0014 inch thick. A coating 24 of an insulating material is applied over the conductive strips 22. This may be conveniently done, for example, by electroplating a synthetic resin, which process facilitates accurate control of the thickness of the coating, preferably about .0005 inch thick. The sheet 20 is laid upon a support (not shown) with the surface bearing the conductive strips 22 facing up. It is cut, as shown, with diagonally opposed, laterally projecting tab portions 26 and 28.

A mold 30 is prepared of a resinous material such as polystyrene, having a striated surface comprising lands 32 separated by grooves 34, the lands being of generally square cross section. In the case where the array is to include magnetically coated filaments about .005 inch in diameter, the lands 32 are made about .008 inch on a side, and the grooves about .017 inch wide. A selected area of the upwardly facing surface of the insulating sheet 20 centrally disposed between the tab portions 26 and 28 is then coated with a hardenable insulating material such as, for example, a liquid monomer of an epoxy resin. The mold 30 is then pressed upon the surface in accurately predetermined alignment, with the lands 32 and grooves 34 of the mold normal to the conductive strips 22 on the insulating sheet. The lands 32 displace the liquid resin from those areas of the conductive strips contacted by them, and the liquid resin substantially completely fills the grooves 34 of the mold. Excess resin is cleared away, and the resin remaining under the mold 30 is cured. The mold 30, being made of polystyrene, may then be removed without dislodging the resin just cured on the sheet. The resin cured in the grooves of the mold constitutes lands 36 bonded to the insulating sheet 20 and through the resin 24 to the conductive strips 22.

Filaments 40 of a stretchable material selected for its resistance to adhesion to a bonding agent to be used in a subsequent step are then laid in the grooves 42 between the lands. In the typical case where the grooves 42 are about .008 inch in depth and width, the stretchable filaments 40 may be, for example, nylon monofilaments about .008 inch in diameter. A bonding agent such as a curable epoxy cement is then spread upon the array of lands 32, grooves 42, and filaments 40, covering all of the striated surface and filling the space in each of the grooves around the stretchable filaments. The opposed tab portions 26 and 28 of the flexible sheet are then folded over upon the cement covered striated surface and carefully aligned so that the conductive strips 22 remain in registration, each one being folded directly back upon itself. The bonding agent is then cured, with the assembly under pressure.

After the bonding step, stiffening plates 44 and 46 of an insulating material such as, for example, glass fiber reinforced epoxy resin, are then cemented on the opposite sides of the structure. The stiffening plates are coextensive with the folded structure, except that their tab portions 48 and 49 are shorter than the tab portions 26 and 28 of the flexible sheet. Those parts of the tab portions 26 and 28 of the flexible sheet that extend beyond the tab portions 48 and 49 of the stiffening plates are then folded back over and cemented to the stiffening plates to expose the conductive strips 22 for connection to external circuitry. The insulating coating 24 may be readily removed from the folded back portions of the conductive strips 22, which then form an array of terminal tabs that can be mated with a spring-finger receptacle (not shown).

The stretchable filaments 40, being of a material to which the bonding cement does not well adhere, and having a tendency to "neck down" when subjected to tension, may be readily withdrawn from the assembly at this point. The assembly is cemented to a base plate 52 which mounts terminal pads 54. The magnetically coated filaments 56 are inserted through the holes (not separately designated) left by the stretchable filaments 40, and electrically connected as by soldering to the terminal pads 54. Connections may be made as desired to the conductive strips 22 carried by the insulating sheet material, preferably by so-called plug-in arrangements. Each one of the conductive strips 22 constitutes a single turn coil around each of the magnetically coated filaments.

What is claimed is:

1. Method of making a magnetic memory device comprising:

(a) producing an array of parallel conductive strips supported by and bonded to a flexible sheet of insulating material, (b) covering the strips with a flexible, adherent film of an insulating material, (c) casting an array of lands upon the strips extending normally thereto over a selected area of the insulating sheet, the lands being bonded to the film, (d) placing filaments of an adhesive-resistant, stretchable material in the grooves defined by the lands, (e) spreading a bonding agent over the array of lands, covering also the grooves and filaments, and at least partially filling the grooves, (f) folding a portion of the sheet material adjacent to the selected area over the lands keeping each one of the strips in register with itself, (g) bonding the folded over portion to the lands by curing the bonding agent, (h) withdrawing the stretchable filaments from the grooves, leaving open passageways through the grooves, and (i) inserting magnetic filaments into the passageways left by the stretchable filaments, the magnetic filaments being of smaller diameter than the stretchable filaments.

2. Method according to claim 1 including the step of folding an end portion of the flexible sheet back upon itself to expose end portions of the conductive strips for connecting the strips to an external circuit.

3. Method according to claim 1 including the steps of bonding rigid sheets to the outer surfaces of the flexible sheet to rigidify the structure, and folding an end portion of the flexible sheet back upon itself across an edge of one of the rigid sheets to expose the conductive strips for connecting the strips to an external circuit.

References Cited

UNITED STATES PATENTS

| | | | |
|---|---|---|---|
| 3,084,336 | 4/1963 | Clemons | 340—174 |
| 3,175,200 | 3/1965 | Hoffman et al. | 340—174 |
| 3,448,514 | 6/1969 | Reid et al. | 29—604 |

CHARLIE T. MOON, Primary Examiner

C. E. HALL, Assistant Examiner

U.S. Cl. X.R.

29—625; 340—174